United States Patent [19]

Sakuma

[11] Patent Number: 4,776,422

[45] Date of Patent: Oct. 11, 1988

[54] MOTORCYCLE WITH FAIRING

[75] Inventor: Tsutomu Sakuma, Saitama, Japan

[73] Assignee: Honda Giken Kogyo Kabushiki Kaisha, Tokyo, Japan

[21] Appl. No.: 55,462

[22] Filed: May 29, 1987

[30] Foreign Application Priority Data

May 30, 1986 [JP] Japan .................................. 61-123654
Jun. 25, 1986 [JP] Japan .............................. 61-97070[U]

[51] Int. Cl.⁴ .......................... B62K 11/02; B62J 17/00
[52] U.S. Cl. ................................. 180/219; 280/289 S; 296/78.1; 296/206
[58] Field of Search .................... 180/219, 227, 225; 280/289 S; 296/78 R, 78.1, 192, 206

[56] References Cited

U.S. PATENT DOCUMENTS

| | | | |
|---|---|---|---|
| 1,430,938 | 10/1922 | Calvignac | 180/219 |
| 3,154,342 | 10/1964 | Mueller | 296/78.1 |
| 4,461,508 | 7/1984 | Ogishima | 280/289 S X |
| 4,585,086 | 4/1986 | Hiramatsu | 180/219 |
| 4,678,054 | 7/1987 | Honda et al. | 180/219 X |
| 4,678,223 | 7/1987 | Kishi et al. | 180/219 X |
| 4,685,530 | 8/1987 | Hara | 180/219 |

FOREIGN PATENT DOCUMENTS 60-4029 2/1985 Japan .
60-67280 4/1985 Japan .
60-146771 8/1985 Japan .

Primary Examiner—John J. Love
Assistant Examiner—Charles R. Watts
Attorney, Agent, or Firm—Irving M. Weiner; Joseph P. Carrier; Pamela S. Burt

[57] ABSTRACT

A motorcycle has a frame assembly having at least a head pipe on which a front fork is steerably supported, a pair of laterally spaced main pipes of rectangular cross section extending rearwardly from the head pipe, and a rear fork swingably coupled to the main pipes, a front wheel rotatably supported on the front fork, a rear wheel rotatably supported on the rear fork, an engine disposed between the front and rear wheels and supported on the frame assembly, a fairing extending rearwardly from a position in front of the head pipe in covering relation to part of the engine and the frame assembly, and a pair of laterally spaced side covers disposed adjacent to and behind the fairing. The fairing has an upper end fastened to the main pipes. The main pipes on rear portions thereof brackets with bolt holes therein. The rear edge of the fairing and the front edges of the side covers are fastened together to the brackets.

12 Claims, 3 Drawing Sheets

MOTORCYCLE WITH FAIRING

BACKGROUND OF THE INVENTION

1. Field of the Invention:

The present invention relates to a motorcycle and more particularly to a motorcycle having a fairing covering front and side portions of the motorcycle for protecting a motorcycle frame and an engine and reducing air resistance produced while the motorcycle is running.

2. Description of the Relevant Art:

One typical motorcycle fairing is disclosed in Japanese Laid-Open Patent Publication No. 60/67280. The disclosed fairing covers a front area of the handlebar and extends around the head lamp and along opposite sides of the engine. The fairing has a ram air inlet opening defined in its front panel for introducing ram air toward the engine. Ram air inlet and outlet ports are also defined in lateral side walls or panels of the fairing for cooling the engine with high efficiency. Ram air is drawn through the ram air inlet ports to cool the engine, and ram air heated by a radiator is discharged through the ram air outlet ports outwardly and rearwardly of the fairing. The fairing comprises a plurality of separate fairing members of suitable shapes formed of synthetic resin by injection molding and interconnected by screws.

Another motorcycle fairing assembly disclosed in Japanese Laid-Open Patent Publication No. 60/146771 discharges ram air that has cooled the engine from a rear portion of the motorcycle on which the fairing assembly is mounted. The disclosed fairing assembly comprises a fairing of synthetic resin covering a front area of the handlebar and extending around the head lamp and along opposite sides of the engine, and a pair of laterally spaced side covers disposed behind the fairing and covering an area below the rider's seat. The side covers have front ends bent outwardly and joined to the rear end of the fairing. Ram air which has been heated by cooling the engine flows from within the fairing and inside of the side covers and is discharged rearwardly of the motorcycle without touching the feet of the rider sitting on the seat.

The known fairings have upper free ends which are not joined to the motorcycle frame. The fairings which are made of synthetic resin, for reasons of appearance and cost, undersirably produce considerable noise while the motorcycle is running because the fairings tend to vibrate in resonance with ram air or engine vibration. Vibration of the fairings, which takes place at all times while the motorcycle is running, is also undersirable fron the standpoint of durability.

With the motorcycle fairing assembly disclosed in Japanese Laid-Open Patent Publication No. 60/146771, it is necessary to fasten the fairing and the side covers to the motorcycle frame, and then to join the fairing and the side covers. However, the process of fastening and joining the fairing and the side covers is tedious and time-consuming, and the number of joint parts is large.

SUMMARY OF THE INVENTION

It is a primary object of the present invention to provide a motorcycle with a fairing which is prevented from vibrating and has an increased degree of durability.

Another object of the present invention is to provide a motorcycle with a fairing and side covers which can be easily installed on a motorcycle frame and joined to each other.

According to the present invention, there is provided a motorcycle comprising a frame assembly having at least a head pipe on which a front fork is steerably supported, a pair of laterally spaced main pipes extending rearwardly from the head pipe, and a rear fork swingably coupled to the main pipes, a front wheel rotatably supported on the front fork, a rear wheel rotatably supported on the rear fork, an engine supported on the frame assembly, and a fairing extending rearwardly from a position in front of the head pipe in covering relation to part of the engine and the frame assembly, the fairing having an upper end fastened to the main pipes.

The fairing comprises a pair of laterally spaced side walls, a pair of laterally spaced steps bent continuously from the side walls, respectively, and a pair of laterally spaced upstanding portions extending substantially vertically from the steps, respectively, and fastened to the main pipes, respectively. The upstanding portions have uppermost ends disposed closely to a flange on the lower end of a fuel tank. With this arrangement, the fairing is not adversely affected by ram air or engine vibration, and noise is considerably reduced, while the motor cycle is running.

According to the present invention, there is also provided a motorcycle comprising a frame assembly having at least a head pipe on which a front fork is steerably supported, a pair of laterally spaced main pipes extending rearwardly from the head pipe, and a rear fork swingably coupled to the main pipes, a front wheel rotatably supported on the front fork, a rear wheel rotatably supported on the rear fork, an engine disposed between the front and rear wheels and supported on the frame assembly, a fairing extending rearwardly from a position in front of the head pipe in covering relation to part of the engine and the frame assembly, and a pair of laterally spaced side covers disposed adjacent to and behind the fairing, the fairing having an upper end fastened to the main pipes, the main pipes having on upper portions thereof brackets with bolt holes therein, the fairing having a rear edge and the side covers having front edges, the rear edge of the fairing and the front edges of the side covers being fastened together to the brackets.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
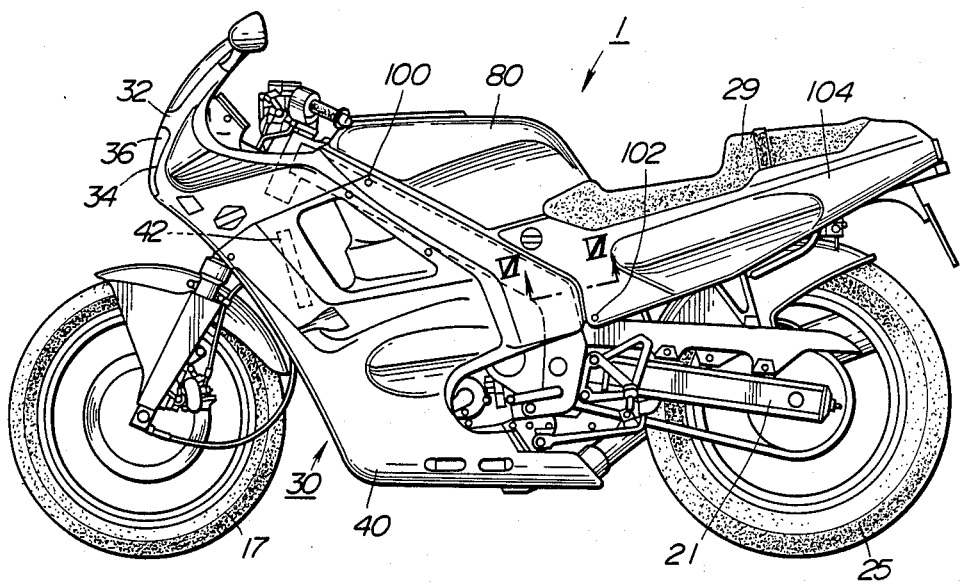
FIG. 1 is a side elevational view of a motorcycle with a fairing according to the present invention.
Figure 2:
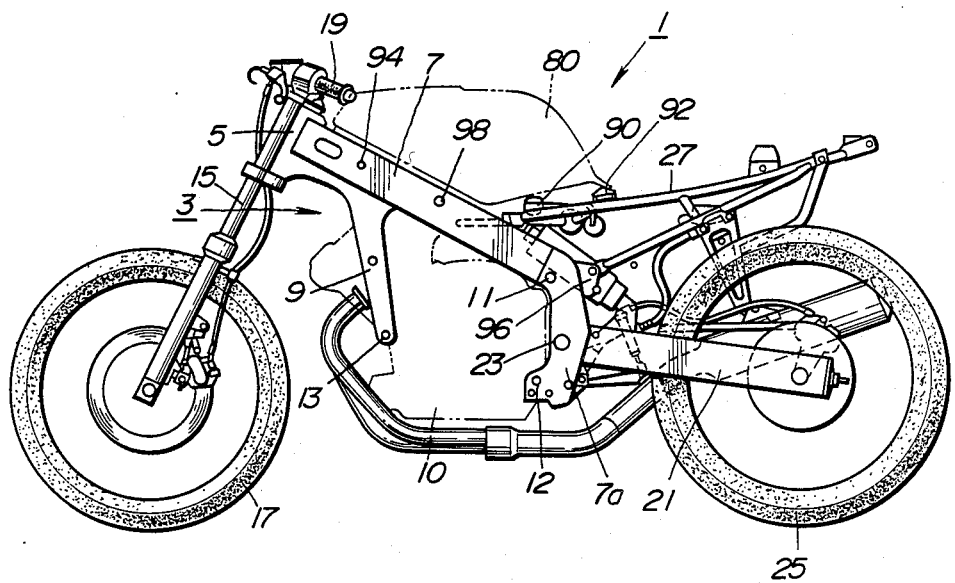
FIG. 2 is a side elevational view of the motorcycle of FIG. 1 with a fairing and side covers omitted from illustration for clearly showing a frame structure.
Figure 3:
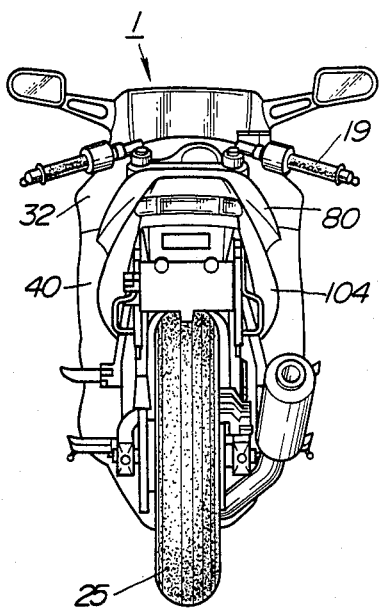
FIG. 3 is a rear elevational view of the motorcycle shown in FIG. 1.

As shown in FIGS. 1 through 3, a motorcycle 1 with a fairing according a preferred embodiment of the present invention has a frame assembly generally designated by the reference numeral 3. The frame assembly 3 comprises a head pipe 5, a pair of laterally spaced, substantially J-shaped main frames 7 of an aluminum alloy inclined downwardly and extending rearwardly from the head pipe 5 and having rear portions 7a directed downwardly, and a pair of laterally spaced engine hangers 9 (only one shown) depending from front portions of the main frames 7 and cooperating with the main frames 7 in supporting an engine 10 with support shafts 11, 12, 13. A front fork 15 on which a front wheel 17 is rotatably supported is steerably supported on the head pipe 5, with a handlebar 19 attached to the top of the front fork 15. To the downwardly extending rear portions 7a of the main frames 7, there are swingably attached two spaced ends of a rear fork 21 having a substangially H shape as viewed in plan with a rear wheel 25 being rotatably supported on the opposite ends of the rear fork 21. Two laterally spaced rear frames 27 are detachably coupled to rear portions of the main frames 7, and a rider's seat or saddle 29 is supported on the rear frames 27.

Figure 4:
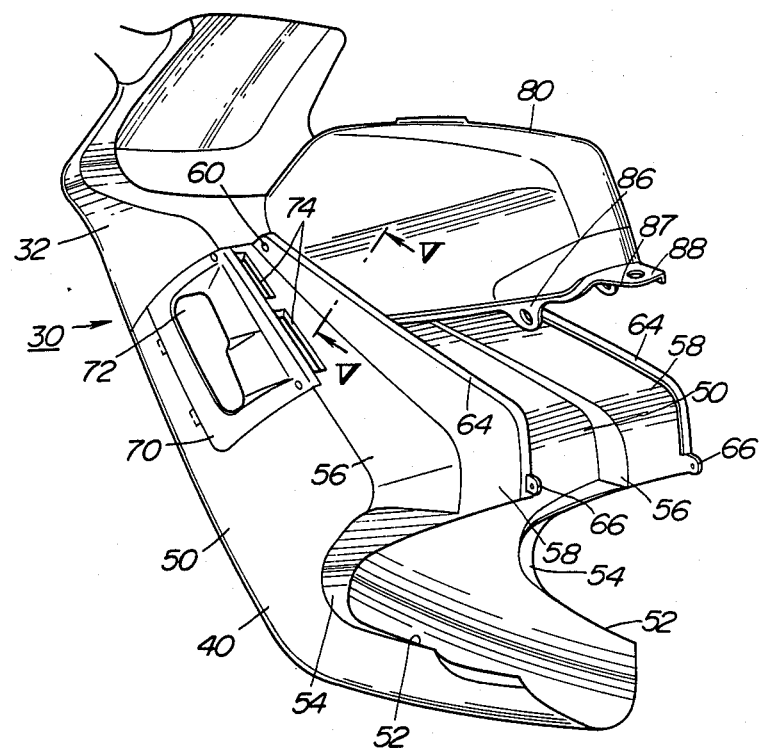
FIG. 4 is an enlarged perspective view of the fairing illustration in FIG. 1.
Figure 5:
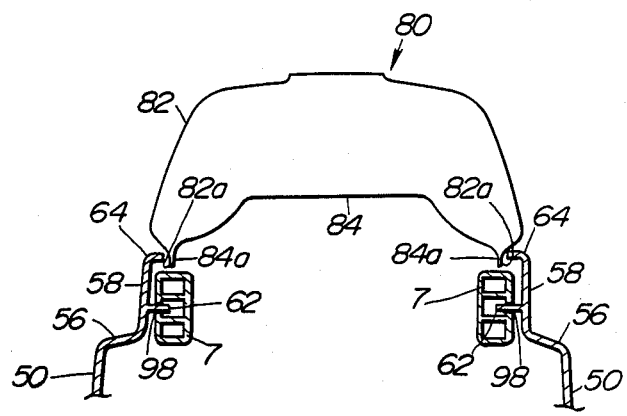
FIG. 5 is a cross-sectional view taken along line V—V of FIG. 4.

As shown in FIG. 4 and 5, a fairing assembly 30 installed on the frame assembly 3 comprises a front fairing 32 extending rearwardly from a position in front of the handlebar 19 in covering relation to the head pipe 5 on opposite sides thereof and having an opening 34 (FIG. 1) in which a head lamp 36 is mounted, and a pair of side fairings 40 joined to the front fairing 32 by suitable means and covering opposite lateral sides of a front motorcycle portion including an engine 10, a radiator 42, and the frame assembly 3. The fairings 32, 40 are preferably formed of synthetic resin by injection molding.

The side fairings 40 have a pair of side walls or panels 50 having respective recesses 52 defined in lower portions thereof and reinforcing flanges 54 extending inwardly and by which the side walls 50 are reinforced, respectively. The side fairings 40 also have steps 56 bent inwardly from upper ends of the side walls 50, respectively, and upstanding portions 58 extending upwardly from the steps 56, respectively. The upstanding portions 58 have attachment holes 60 defined in distal ends thereof. Each of the upstanding portions has one or more headed pins 62 (FIG. 5) integrally formed with its inner side wall surface. Reinforcing flanges 64 project horizontally inwardly from longitudinal edges of the upstanding portions 58, and have apertured brackets 66 on their rear ends. Interior inspection covers 70 are removably attached to front portions of the respective side walls 50. The covers 70 and the steps 56 have vent holes 72, 74, respectively, defined therein. Heated air that has passed through the radiator 42 is discharged out through the vent holes 72, 74.

In FIGS. 4 and 5, a fuel tank 80 comprises an outer panel 82 having flanges 82a on opposite edges thereof and an inner or bottom panel 84 having flanges 84a on opposite edges thereof, the flanges 82a, 84a being joined to each other by suitable means such as seam welding. The joined flanges have three brackets 86, 87, 88 with bolt holes. When installing the fuel tank 80 on the motorcycle frame assembly 3, bolt holes (not shown) defined in the rear frames 27 and attachment members 90 (only one shown), 92 disposed between the rear frames 27 are brought into registry with the thread holes of the brackets 86, 87, 88, and bolts (not shown) are passed through the aligned bolt holes.

As illustrated in FIG. 5, each of the main frames 7 is of a rectangular cross section and has a ladder-shaped internal structure. As shown in FIG. 2, the front end portion of each of the main frames 7 has a bolt hole 94 for attachment of the corresponding side fairing, and the curved portion of each main frame 7 has a bracket 96 projecting therefrom and having a bolt hole. As many rubber grommets 98 as the number of headed pins 62 on the side fairings 40 are disposed on the outer side surfaces of the main frames 7.

For installing the side fairings 40 on the main frames 7, the upstanding portions 58 of the side fairings 40 are brought closely to the outer sides of the main frames 7 with the flanges 64 near the upper surfaces of the main frames 7. Then, the headed pins 62 are fitted into the respective grommets 98, and the attachment holes 60 of the upstanding portions 58 at the upper or free ends of the side fairings 40 and the bolt holes of the brackets 66 are registered with the bolt holes 94 of the main frames 7 and the bolt holes of the brackets 96. Finally, bolts 100, 102 are passed through the aligned bolt holes to fasten the side fairings 40 to the main frames 7. Since the upper ends of the side fairings 40 are secured to the main frames 7, any vibration of the fairing assembly 30 which may be produced while the motorcycle is running can be suppressed.

The joined flanges 82a, 84a on the lower end of the fuel tank 80 are located in the vicinity of the distal edges of the reinforcing flanges 64 of the upstanding portions 58. Therefore, the assembled structure has a neat appearance.

Figure 6:
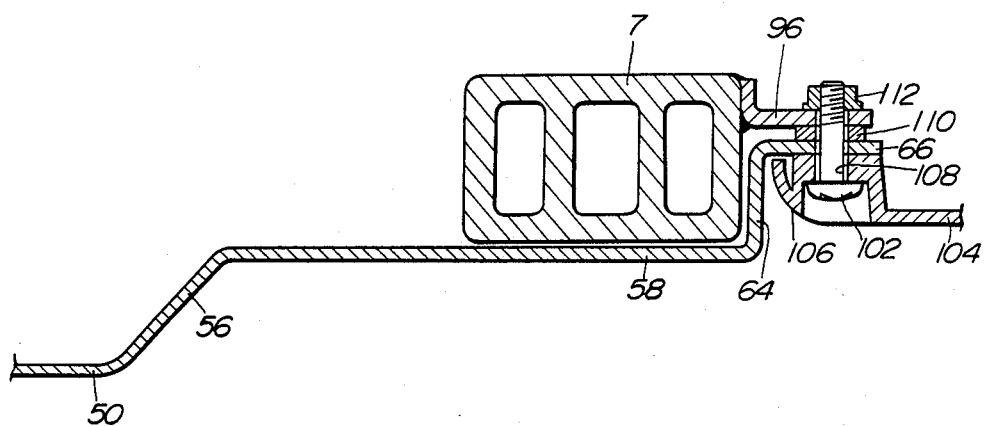
FIG. 6 is an enlarged cross-sectional view taken along line VI—VI of FIG. 1.

As shown in FIG. 6, side covers 104 may be disposed adjacent to and behind the side fairings 40. The side covers 104 have fixing portions 106, respectively, on their distal lower ends. The fixing portions 106 are of a substantially C-shaped cross section and have respective bolt holes 108.

Attachment of the side covers 104 to the main frames 7 and the side fairings 40 will be described with reference to FIG. 6 which shows only one side cover 104 and associated components. The brackets 66 of the upstanding portions 58 of the side fairings 40 are brought into registry with the respective brackets 96 of the main frames 7, with spacers 110 interposed between the registered brackets 66, 96. Then, the fixing portions 106 of the side covers 104 are placed on the brackets 66, respectively. Bolts 102 are inserted through the bolt holes from outside, and thereafter nuts 112 are threaded over the inner ends of the bolts 102.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. a motorcycle comprising:
   a frame assembly having at least a head pipe on which a front fork is steerably supported, a pair of laterally spaced main pipes extending rearwardly from said head pipe, and a rear fork swingably coupled to said main pipes;

a front wheel rotatably supported on said front fork;

a rear wheel rotatably supported on said rear fork;

a engine supported on said frame assembly; and a fairing extending rearwardly from a position in front of said head pipe in covering relation to part of said engine and said frame assembly;

said fairing having an upper end fastened to said main pipes; and said fairing comprising a pair of laterally spaced side walls, a pair of laterally spaced steps bent continuously from said side walls, respectively, and a pair of laterally spaced upstanding portions extending substantially vertically from said steps, respectively, and fastened to said main pipes, respectively.

2. A motorcycle according to claim 1, wherein said upstanding portions have headed pins integrally formed respectively on inner surfaces thereof, said main pipes having rubber grommets, respectively, in which said headed pins are fitted, respectively.

3. A motorcycle according to claim 1, wherein said upstanding portions have reinforcing flanges, respectively, extending inwardly therefrom.

4. A motorcycle according to claim 3, wherein said main pipes are of a rectangular cross section and have upper surfaces lying along said reinforcing flanges of said upstanding portions and outer surfaces lying along inner surfaces of said upstanding portions.

5. A motorcycle according to claim 4, wherein each of said main pipes has a ladder-shaped internal structure.

6. A motorcycle according to claim 4, further including a fuel tank having a downwardly projecting flange on a lower end thereof, said flange being disposed closely to distal ends of said reinforcing flanges of said upstanding portions.

7. a motorcycle comprising:

a frame assembly having at least a head pipe on which a front fork is steerably supported, a pair of laterally spaced main pipes extending rearwardly from said head pipe, and a rear fork swingably coupled to said main pipes;

a front wheel rotatably supported on said front fork;

a rear wheel rotatably supported on said rear fork;

an engine disposed between said front and rear wheels and supported on said frame assembly;

a fairing extending rearwardly from a position in front of said head pipe in covering relation to part of said engine and said frame assembly; and a pair of laterally spaced side covers disposed adjacent to and behind said fairing;

said fairing having an upper end fastened to said main pipes;

said main pipes having on upper portions thereof brackets with bolt holes therein, said fairing having a rear edge and said side covers having front edges, said rear edge of said fairing and said front edges of said side covers being fastened to said brackets; and said fairing comprising a pair of laterally spaced side walls, a pair of laterally spaced steps bent continuously from said side walls, respectively, a pair of laterally spaced upstanding portions extending substantially vertically from said steps, respectively, and fastened to said main pipes, respectively.

8. A motorcycle according to claim 7, wherein said upstanding portions have headed pins integrally formed respectively on inner surfaces thereof, said main pipes having rubber grommets, respectively, in which said headed pins are fitted, respectively.

9. A motorcycle according to claim 7, wherein said upstanding portions have reinforcing flanges, respectively, extending inwardly therefrom.

10. A motorcycle according to claim 9, wherein said main pipes are of a rectangular cross section and have upper surfaces lying along said reinforcing flanges of said upstanding portions and outer surfaces lying along inner surfaces of said upstanding portions.

11. A motorcycle according to claim 10, wherein each of said main pipes has a ladder-shaped internal structure.

12. motorcycle according to claim 10, further including a fuel tank having a downwardly projecting flange on a lower end thereof, said flange being disposed closely to distal ends of said reinforcing flanges of said upstanding portions.

* * * * *

UNITED STATES PATENT AND TRADEMARK OFFICE
CERTIFICATE OF CORRECTION

PATENT NO. : 4,776,422

DATED : October 11, 1988

INVENTOR(S) : Tsutomu Sakuma

It is certified that error appears in the above-identified patent and that said Letters Patent is hereby corrected as shown below:

```
Column 1, line 52, correct the spelling of --undesirable--;
          line 53, change "fron" to --from--.
Column 2, line 27, change "motor cycle" to --motorcycle--.
Column 3, line 5, after "according" insert --to--;
          line 21, correct the spelling of --substantially--;
          line 28, change "FIG." to FIGS--.
Column 4, line 65 (claim 1, line 1), change "a" to --A--.
Column 5, line 5 (claim 1, line 9), change "a" to --an--;
          line 40 (claim 7, line 1), change "a" to --A--.
Column 6, line 19 (claim 7, line 25), after "respectively" insert --and--;
          line 40 (claim 12, line 1), before "motorcycle" insert --A--.
```
In the Abstract, line 14, after "pipes (first occurrence) insert --have--.

Signed and Sealed this

Twenty-first Day of November, 1989

*Attest:*

JEFFREY M. SAMUELS

*Attesting Officer*     *Acting Commissioner of Patents and Trademarks*